United States Patent
Biris et al.

(10) Patent No.: US 11,025,064 B2
(45) Date of Patent: Jun. 1, 2021

(54) RELATING TO REACTIVE POWER SUPPORT IN WIND POWER PLANTS

(71) Applicant: VESTAS WIND SYSTEMS A/S, Aarhus N (DK)

(72) Inventors: Ciprian Biris, Hinnerup (DK); Manoj Gupta, Singapore (SG); Henrik Møller, Egå (DK); Kouroush Nayebi, Ikast (DK); Janakiraman Sivasankaran, Singapore (SG); Mu Wei, Solbjerg (DK); Hans Kristian Bjørn, Randers SØ (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 4 days.

(21) Appl. No.: 16/468,251

(22) PCT Filed: Nov. 24, 2017

(86) PCT No.: PCT/DK2017/050390
§ 371 (c)(1),
(2) Date: Jun. 10, 2019

(87) PCT Pub. No.: WO2018/103800
PCT Pub. Date: Jun. 14, 2018

(65) Prior Publication Data
US 2020/0076193 A1    Mar. 5, 2020

(30) Foreign Application Priority Data
Dec. 9, 2016   (DK) .............................. PA201670976

(51) Int. Cl.
*H02J 3/18* (2006.01)
*F03D 9/25* (2016.01)
*H02J 3/38* (2006.01)

(52) U.S. Cl.
CPC ............ *H02J 3/1842* (2013.01); *F03D 9/255* (2017.02); *H02J 3/386* (2013.01); *H02J 2203/20* (2020.01)

(58) Field of Classification Search
CPC ...... H02J 3/1842; H02J 3/386; H02J 2203/20; F03D 9/255; F03D 7/0284; F03D 7/048
(Continued)

(56) References Cited

U.S. PATENT DOCUMENTS

2004/0075278 A1* 4/2004 Canini ...................... F03D 9/25
                                                                    290/44
2006/0273595 A1* 12/2006 Avagliano ............... F03D 7/028
                                                                    290/44

(Continued)

FOREIGN PATENT DOCUMENTS

| DE | 102008048258 A1 | 4/2010 |
|----|-----------------|--------|
| EP | 3075051 A1 | 10/2016 |
| WO | 2016034178 A1 | 3/2016 |
| WO | 2018103800 A1 | 6/2018 |

OTHER PUBLICATIONS

PCT Notification of Transmittal of the International Search Report and the Written Opinoin of the International Searching Authority, or the Declaration for Application No. PCT/DK2017/050390 dated Feb. 19, 2018.

(Continued)

*Primary Examiner* — Rocio Del Mar Perez-Velez
*Assistant Examiner* — Alicia M. Choi
(74) *Attorney, Agent, or Firm* — Patterson + Sheridan, LLP

(57) ABSTRACT

A wind power plant system comprising: a plurality of wind turbine generators each having a corresponding generator controller, and a power plant controller for controlling the power generated by the wind power plant system; wherein at least some of the plurality of generator controllers are (Continued)

each configured to: generate a model that indicates the thermal capacity of one or more components of the wind turbine generator, determine power capacity data from the model, said data relating to: at least one reactive power supply level and a corresponding time limit for which that reactive power supply level may be maintained, and transmit to the power plant controller the determined power capacity data, wherein the power plant controller is operable to receive the power capacity data from the plurality of generator controllers and to transmit respective power references to the plurality of generator controllers to control the power generated by the wind power plant system.

15 Claims, 4 Drawing Sheets

(58) Field of Classification Search
USPC ........................................................ 700/287
See application file for complete search history.

(56) References Cited

U.S. PATENT DOCUMENTS

| | | |
|---|---|---|
| 2007/0162189 A1* | 7/2007 | Huff ..................... H02P 9/105 |
| | | 700/287 |
| 2008/0150283 A1 | 6/2008 | Rivas et al. |
| 2009/0218817 A1 | 9/2009 | Cardinal et al. |
| 2010/0298991 A1 | 11/2010 | Alonso Sadaba et al. |
| 2013/0313827 A1 | 11/2013 | Lovmand et al. |
| 2015/0275862 A1 | 10/2015 | Babazadeh et al. |
| 2017/0338652 A1* | 11/2017 | Ubben .................... H02J 3/383 |

OTHER PUBLICATIONS

Danish Patent and Trademark Office First Technical Examination of Application No. PA 2016 70976 dated Jun. 8, 2017.
Intellectual Property First Examination for Application No. 201917055338 dated Feb. 11, 2021 (Feb. 11, 2021).

* cited by examiner

RELATING TO REACTIVE POWER SUPPORT IN WIND POWER PLANTS

TECHNICAL FIELD

The present invention relates to a wind power plant system and to a method of controlling a wind power plant. Further aspects of the invention relate to a generator controller for use in a wind power plant system and to a power plant controller for use in a wind power plant system and in a method as described herein.

BACKGROUND

It is now expected that newly commissioned wind power plants and other forms of renewable energy are able to offer voltage control at a point of interconnection. A wind power plant comprises a plurality of wind turbine generators and is also known as a wind park or a wind farm. The regulation and general operation of the power plant is controlled by a power plant control system or controller (PPC), which implements operational limits and requirements as set out by a Transmission System Operator (TSO) or in country-specific grid interconnection requirements or 'grid codes'. The TSO also communicates power delivery demands to the PPC, including reactive power delivery demands.

Reactive power limits are outlined by so-called P-Q charts, which outline the reactive power exchange limits based on real power output. The PPC implements power delivery demands received from the TSO, whilst ensuring that the limits and requirements set out in the P-Q charts are upheld.

Voltage control capabilities are a requirement of many grid codes, and therefore the limited control capabilities may act as a challenge to grid integration of wind power plants. However, wind turbines generators have limited reactive power capability, which causes problems when attempting to meet these grid integration requirements. Attempts to solve these problems involve installing extra reactive power compensation equipment. However, this is a particularly expensive solution.

It is an aim of the present invention to address disadvantages associated with the prior art.

SUMMARY OF THE INVENTION

According to an aspect of the invention, there is provided a wind power plant system comprising: a plurality of wind turbine generators each having a corresponding generator controller, and a power plant controller for controlling the power generated by the wind power plant system; wherein at least some of the plurality of generator controllers are each configured to: generate a model that indicates the thermal capacity of one or more components of the wind turbine generator, determine power capacity data from the model, said data relating to: at least one reactive power supply level and a corresponding time limit for which that reactive power supply level may be maintained, and transmit to the power plant controller the determined power capacity data, wherein the power plant controller is operable to receive the power capacity data from the plurality of generator controllers and to transmit respective power references to the plurality of generator controllers to control the power generated by the wind power plant system.

Advantageously generating a model specific to each wind turbine allows for highly accurate power capacity data to be determined and communicated to the power plant controller. The communication of the data to the power plant controller in a kind of 'handshake' exchange ensures that the power plant controller can carefully decide and prioritise each wind turbine generator according to its potential to be overloaded, while ensuring that the safety of operation of each generator is maintained.

According to another aspect of the invention, there is provided a method of operating a wind power plant comprising a plurality of wind turbine generators, the method comprising receiving, from one or more of the wind turbine generators, power capacity data relating to: at least one reactive power supply level, and a corresponding time limit for which that reactive power supply level may be maintained, transmitting respective power references to the plurality of wind turbine generators in dependence on the received power capacity data. The power capacity data may be derived from a model generated by a generator controller associated with a wind turbine generator. The model may indicate the thermal capacity of at least one component of the wind turbine generator. The method may be implemented using a power plant controller.

The model may be generated in dependence upon installation parameters of the wind turbine generator and/or upon pre-determined thermal relationships of each component. For example, these installation parameters may comprise altitude of the WTG, pre-defined component-specific parameters such as power ratings, safety limits and size, or expected temperature range.

The thermal capacity may be indicated in terms of a current magnitude of each component.

The generator controllers may be configured to alter the model in dependence upon operational conditions of the wind turbine. Operational conditions may comprise current wind speed, ambient temperature, current temperature of components or previously modelled or recorded data. As different generators will face different conditions based upon their placement and continued operation, a single wind power plant thermal model is inadequate, and in allowing turbine-specific models to be created, a much better overview of the system can be maintained, and a safer operation achieved.

In some embodiments of the invention, the corresponding time limit is determined to avoid exceeding the thermal capacity of the one or more components. A time limit is important to avoid components overheating and being irreparably damaged.

Optionally, the power capacity data also includes a cool-down time period. A cool-down period is also particularly important, and may be provided later than the other power capacity data is provided. The cool-down period ensures that components that may have been approaching their thermal limit during a period of high reactive power supply can cool down sufficiently so that they may once again be operated at a higher reactive power supply level.

The generator controllers may be configured to transmit the determined power capacity data to the power plant controller in response to a request from the power plant controller. The method may comprise requesting, from one or more of the wind turbine generators, power capacity data relating to: at least one reactive power supply level, and a corresponding time limit for which that reactive power supply level may be maintained. The at least one reactive power supply level may be in excess of a pre-determined reactive power supply limit so as to provide a reactive power boost. Providing a reactive power boost is particularly important to be able to meet grid requirements, and to reduce the reliance of a wind power plant system on expensive compensation equipment. By provided over-boost capabilities in wind turbine generators, an instantaneous response can be immediately provided to the grid without having to wait for compensation equipment to warm up.

The power plant controller may be configured to request power capacity data in response to a request for reactive power supply received from a transmission system operator. The method may comprise receiving, from a transmission system operator associated with a power transmission network, a request for reactive power supply, and wherein the request for power capacity data is made in response to the request for reactive power supply from a transmission system operator.

The power plant controller may be configured to transmit respective power references to the plurality of generator controllers in dependence upon the request for reactive power supply. The method may comprise transmitting respective power references in dependence upon the request for reactive power supply. The power plant controller may be configured to transmit respective power references to the plurality of generator controllers in dependence upon the received power capacity data.

The power plant controller may be configured to transmit respective power references to the plurality of generator controllers until reactive power supply is no longer requested by the transmission system operator. The method may comprise transmitting respective power references until reactive power supply is no longer requested by the transmission system operator.

Each power reference may comprise at least a first command to the generator controller to operate the wind turbine generator to supply reactive power at a level equal to a reactive power supply level of the determined power capacity data for a time period that is less than or equal to the time limit that corresponds to the reactive power supply level.

Each power reference may comprise at least one further command to the generator controller to operate the wind turbine generator to supply reactive power at a level lower than the level of the first command.

Each power reference may comprise a de-rating command to the generator controller to de-rate the wind turbine generator to reduce the reactive power supply and/or the active power supply, and wherein the de-rating command is transmitted to the corresponding generator controller after the time period of the first command. For example, the first command may implement a maximum boost reactive power supply level, while the further commands may be to reduce the reactive power supply level in steps until the usual reactive power supply level is reached once again. Then, the de-rating command is implemented to reduce the output of the wind turbine to prioritise a cooling down over power supply. During the implementation of the first and further commands, reactive power supply may be prioritised over active power supply.

The generator controllers may be each configured to control the operation of the wind turbine generator in dependence on the transmitted respective power references.

The wind power plant may comprise compensation equipment. The power plant controller may be operable to transmit power references to the compensation equipment to maintain the reactive power supply level of the wind power plant system. The method may comprise transmitting power references to the reactive power compensation equipment to maintain the reactive power supply level of the wind power plant.

According to another aspect of the invention, there is provided a power plant controller for use in the wind power plant system as described above, or for implementing the method as described above.

According to another aspect of the invention, there is provided a generator controller for use in the wind power plant system as described above.

According to another aspect of the invention, there is provided a wind power plant comprising the power plant controller as described above.

According to another aspect of the invention, there is provided a computer-readable storage medium comprising instructions which, when executed on a power plant controller of a wind power plant cause the power plant controller to carry out the method as described above.

BRIEF DESCRIPTION OF THE DRAWINGS

One or more embodiments of the invention will now be described, by way of example only, with reference to the accompanying drawings, in which.

DETAILED DESCRIPTION

Figure 1:
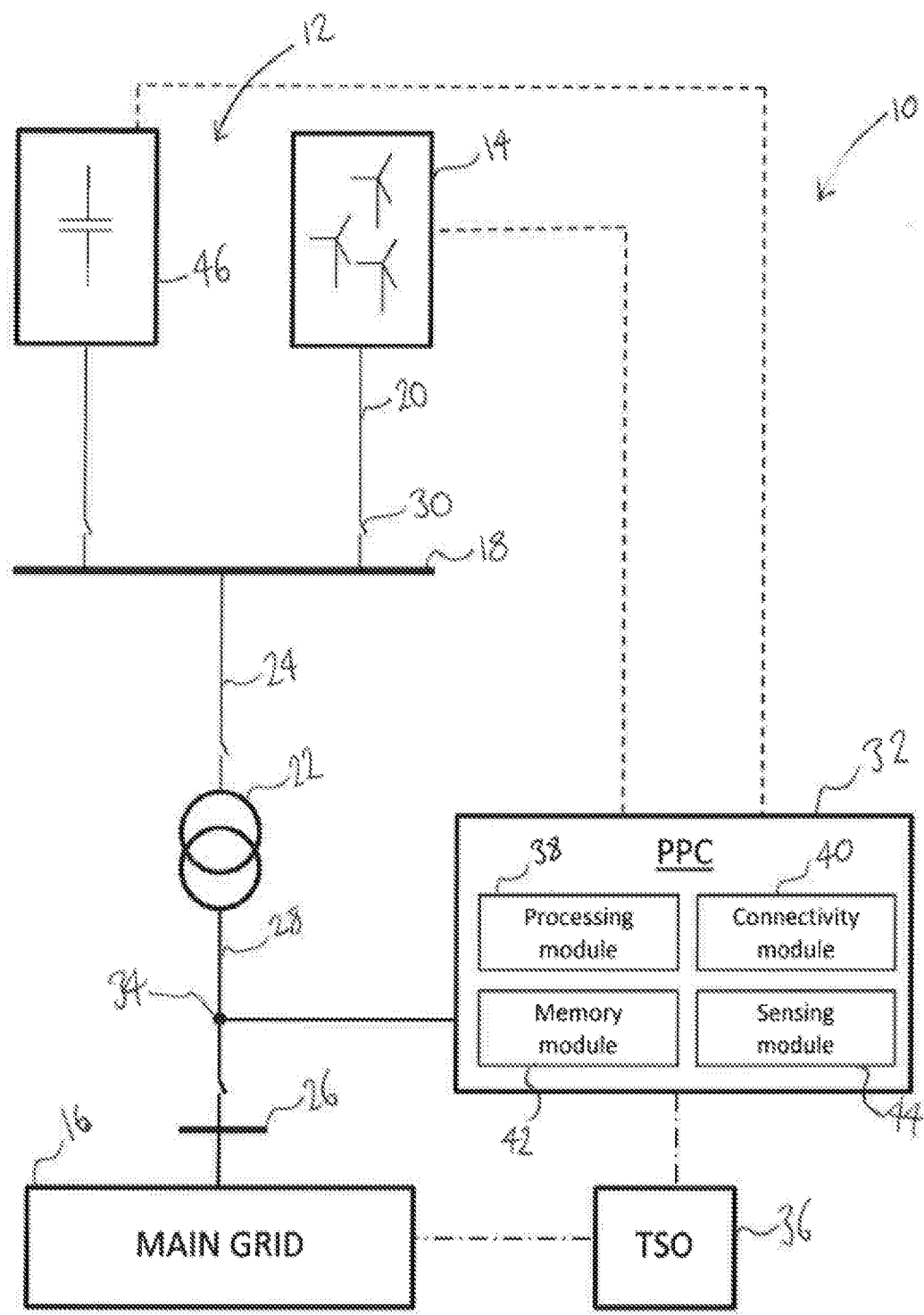
FIG. 1 is a schematic view of a wind power plant and its connection to a grid.

FIG. 1 illustrates a typical architecture in which a wind power plant (WPP) is connected to a main transmission grid as part of a wider power network. The example shown is representative only and the skilled reader will appreciate other specific architectures are possible, in relation to both wind power plants and power plants for other renewable energy sources. In addition, the skilled reader will appreciate that methods, systems and techniques also described below may be applicable to many different configurations of power network. Moreover, the components of the wind power plant and power network are conventional and as such would be familiar to the skilled reader.

FIG. 1 shows a power network 10 incorporating a wind power plant (WPP) 12 including a plurality of wind turbine generators (WTGs) 14 often more commonly called 'wind turbines'. A single WTG would also be possible. Each of the plurality of WTGs 14 converts wind energy into electrical energy, which is transferred from the WTGs 14 to a main transmission power network 16 or main grid, as active power, for distribution.

WTGs 14 generate both active power and reactive power. The main grid 16 often has reactive power requirements to support voltage changes, and the output of WTGs 14 can be changed to match these requirements in real time. Some reactive power requirements cannot be achieved by operation of WTGs 14 only, so compensation equipment 46 may be used to accommodate the shortfall. The current invention provides a method 100 and a system 10 that can provide extra reactive power when operating WTGs 14 at full active power output that reduces the reliance on compensation equipment 46.

Returning to FIG. 1, each of the WTGs 14 of the WPP 12 is connected to a local grid that links the WTGs 14. The WPP 12 is, in turn, suitably connected to a collector bus 18 via a feeder line 20. The collector bus 18 may be at an intermediate voltage level that is suitable for relatively short distance power transmission, for example in the region of 10 kV to 150 kV, most usually between 110 kV and 150 kV. The collector bus 18 may also provide a point of common coupling (PCC) for a plurality of wind power plants, although, only a single WPP 12 is shown here for simplicity.

The collector bus 18 is connected to a main step-up transformer 22 by a transmission line 24. The main transformer 22 is in turn connected to the main grid 16 at a Point of Interconnection (PoI) 26 by another transmission line 28. The PoI 26 is an interface between the WPP 12 and the main grid 16.

While the collector bus 18 may be required to span distances up to around 100 km, the main grid 16 may be an international, national, or regional grid such as the National Grid of Great Britain, for example, and therefore may be required to span distances of up to around 250 km or more. Accordingly, the voltage level of the main grid 16 may be much higher than the voltage level of the collector bus 18 for better transmission efficiency.

The connecting lines such as the transmission and feeder lines 20, 24, 28 may each include a protection system 30 to protect individual components from damage during or following extreme conditions. For example, it is envisaged that at least an appropriate circuit breaker will be included in each line.

Hereinafter, it should be assumed that references to components being connected or connections between components comprise suitable feeder or transmission lines as described above unless it is otherwise indicated.

A WTG 14 comprises a plurality of rotor blades attached to a central hub. The central hub is rotatably attached to a nacelle and to a generator unit. The WTG 14 also incorporate at least one central controller that is configured to monitor the operating status of the WTG 14 to maintain an optimised energy generation, and is also configured to communicate with a power plant controller (PPC) 32 and other control systems external to the WTG 14. The central controller is capable of altering the operation of other components of the WTG 14 to effect changes in the reactive and active power output of the WTG 14 in reaction to commands from the PPC 32. The PPC 32 is also supplied with information relating to the operation and monitoring of the WTG 14 by the central controller. In some embodiments, several WTGs 14 may share a single WTG controller.

In particular, the central controller monitors parameters relating to the thermal status of the WTG 14. Parameters may, for example, include ambient temperature, temperature of individual components, rotational speed of components, cumulative operational periods of components, humidity, voltage and current levels, and reactive/active power generation. Monitoring of said parameters is then used by the central controller to update a thermal map or model of the WTG 14. The thermal model may be generated by the or each WTG and be used to predict the potential for components to be driven above their rated capabilities without exceeding a thermal limit. Power capacity data from the thermal model and other parameters relating to the operative status of the WTG 14 are suitably communicated from the WTG 14 to the PPC 32 when requested. An exemplary embodiment of a thermal model that may be incorporated into the central controller of a WTG 14 is discussed later.

Still considering FIG. 1, in addition to being in communication with the WPP 12, the PPC 32 is connected to the power network at a Point of Measurement (PoM) 34 and is also connected directly to the WPP 12, and each individual WTG 14. The role of the PPC 32 is to act as a command and control interface between the WPP 12 and a grid operator or transmission system operator (TSO) 36. The TSO 36 is responsible for indicating the needs and requirements of the main grid 16 to the PPC. The PPC 32, in its role as command and control interface, interprets the power delivery demands requested of it by the TSO 36 and manages the wind turbines 14 in the WPP 12 in order to satisfy those requirements, whilst taking into account other operative factors such as grid faults and sudden changes in output or measured grid voltage.

The PPC 32 is a suitable computer system for carrying out the controls and commands as described above and so incorporates a processing module 38, a connectivity module 40, a memory module 42 and a sensing module 44.

In order to monitor and regulate the output of the WPP 12 and to interpret the power demands correctly, the PPC 32 is connected to the transmission line 28 between the main transformer 22 and the PoI 26 at the PoM 34. The PPC 32 is equipped to measure a variety of parameters including a representative power output that will be supplied to the main grid 16 at the PoI 26 by the WPP 12. As the PoM 34 is not at the PoI 26, the measured parameters are only representative as losses in the lines between the PoM 34 and PoI 26, and between the PoM 34 and the PPC 32, may have an effect on the measurements. Suitable compensation may take place to account for the losses to ensure that the measurements are accurate.

In addition, the PPC 32 measures parameters of the power output such as a frequency and voltage, as well as reactive power exchange between the WPP 12 and the main grid 16 and the voltage level of the main grid 16. The PPC 32 compares the measured parameters against specific grid requirements and communicates control commands to specific components of the WPP 12 accordingly. The WPP 12 is capable of altering its reactive power output in reaction to commands received from the PPC 32 by changing the operation of the WTGs 14.

To ensure a greater level of control over reactive power exchange, reactive power compensation equipment 46 is incorporated into the WPP 12, such as a capacitor bank, a Static Synchronous Compensator (STATCOM) or Static VAR Compensator (SVC), and this equipment connects to the collector bus 18 in parallel to the plurality of WTGs 14. The compensation equipment 46 is configured to provide reactive power compensation when required, such as when instructions are received from the PPC 32 according to a control strategy.

The PPC 32 communicates control commands to both the compensation equipment 46 and to the WTGs 14 in a suitable manner. It will be noted that FIG. 1 is a schematic view, so the way in which the control commands are transferred to the compensation equipment 46 and/or the WPP 12 is not depicted explicitly. However, it will be appreciated that suitable cabling may be provided to interconnect the PPC 32 and the compensation equipment 46/WTGs 14. The interconnections may be direct or 'point to point' connections, or may be part of a local area network (LAN) operated under a suitable protocol (CAN-bus or Ethernet for example). Also, it should be appreciated that rather than using cabling, the control commands may be transmitted wirelessly over a suitable wireless network, for example operating under WiFi™ or ZigBee™ standards (IEEE802.11 and 802.15.4 respectively).

The diagram of FIG. 1 should be taken as a representation of a wind power plant 12 only. Alternative configurations of wind power plants are known and it is expected that other known components may be incorporated in addition to or as alternatives to the components shown and described in FIG. 1. Such changes would be within the capabilities of the skilled person. For example, substations or extra transformers would be expected to be incorporated in the wind power plant depending upon the number of WTGs 14 included in the plurality of WTGs 14.

In some embodiments, the PoM 34 may be positioned at a different position in the system such that the parameters measured by the PPC 32 are not representative of the actual values for those parameters at the PoI 26 and the values may differ by an order of magnitude or more. In this case, a correction factor may be applied to the measurements to adjust for the different position of the PoM 34 relative to the PoI 26. It therefore does not matter where the PoM 34 with regard to the PoI 26, so long as there is a predetermined correction factor. Therefore, the measured voltage may be indicative of, or associated with, the voltage at the point of interconnection, even if the voltage is not measured directly at that location.

Figure 2:
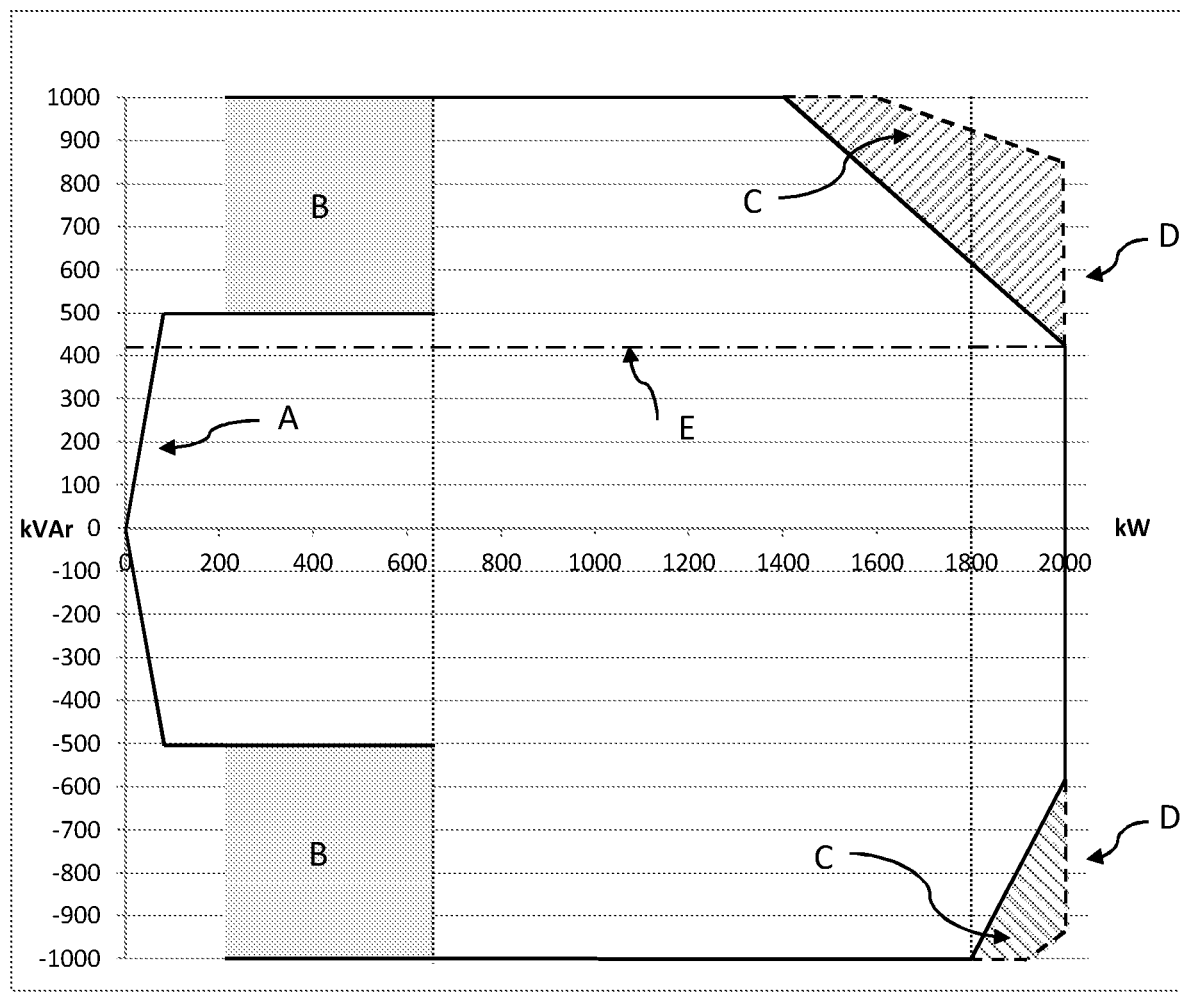
FIG. 2 is a P-Q chart illustrating the reactive power capabilities with respect to active power generation of a wind turbine generator according to an embodiment of the invention.

FIG. 2 shows a relationship between the reactive power limit levels, shown on the y axis and active power (P), shown on the x axis, of a WTG 14 with a rated maximum power generation of 2 MW. The line ('A') extending from the intersection of the y and x axes corresponds to 0 kVAr, or no net reactive power exchange. A reactive power level between 0 kVAr and 1000 kVAr indicates the level of reactive power that is being supplied to the main grid 16 by the WPP 12. A reactive power level measured between −1000 kVAr and 0 kVAr indicates the level of reactive power that is absorbed from the main grid 16 by the WPP 12.

The reactive power limit level is defined by the operating parameters of the WTG 14 and takes into account various operational factors so as to build in a safety margin. Generation of higher reactive power levels outside of the reactive power limit levels is possible but could result in unsafe operation of the WTG 14. It should be noted that the values shown in FIG. 2 are representative only of one 2 MW WTG. However, the relationships of FIG. 2 may also be adapted for other WTG ratings or even other renewable energy generators such as wave energy generators and photovoltaics, and the specification of a 2 MW WTG is purely for demonstrative purposes. The principles outlined in this application are not specific to particular WTGs, and are applicable to WTGs rated at any power in combination with a PPC. The reactive power capability relationships shown in FIG. 2 would be known to the skilled person as a typical reactive power limit to active power relationship.

It can be seen that two differing configurations exist in FIG. 2, which relate to different configurations of an armature winding of the WTG 14. Between active power levels of 0 kW and 650 kW, as marked in FIG. 2, a first armature winding configurations exists, and in the first configuration, the reactive power limits are −500 kVAr and 500 kVAr. In a second armature winding configuration, between active power generation capability of approximately 200 kW and 2000 kW (2 MW), the reactive power limits are −1000 kVAr and 1000 kVAr. Two switching regions exist between the first and second configurations, shown in FIG. 2 as shaded areas CBI where the power ratings of the configurations overlap.

As would be known by the skilled person, different winding configurations are used in order to optimise conversion efficiencies at different wind speeds. For example, a star configuration may be used at relatively low wind speeds, hence lower voltages, whereas a delta configuration may be preferred at higher wind speeds and hence higher voltages.

In the second configuration, the reactive power exchange limits, indicated by the solid line, reduces as the active power output level tends to its maximum. In FIG. 2, the reactive power limit level for reactive power supply reduces linearly from 1000 kVAr to 410 kVAr between the 1400 kW and 2000 kW active power levels, while the limit of absorption of reactive power reduces from −1000 kVar to −589 kVar between 1800 kW and 2000 kW active power. As discussed above, this reduction is to ensure safe operation of the WTGs 14.

Two further regions are defined in FIG. 2 indicated by hatching (CI which are bound on one side by one of the reactive power exchange limit levels, and bound on the remaining three sides by a new limit line, indicated in FIG. 2 as a dashed line ('D'). Reactive power values in the hatched regions are achievable by each WTG 14 in an "over-boost" mode, where the WTG 14 is driven above its normal rating to supply a high reactive power level at a high active power level.

When in an over-boost mode, the WTG 14 operates at a higher operational level than it would during normal use. Operating in over-boost mode for a particular duration can cause components to reach their thermal limits. Therefore, while the WTG 14 may operate at the higher operational level, that level must not be sustained for longer than the particular duration or damage will be caused to the WTG 14, which may cause a fall in performance or, worse, component failure or damage.

The duration for which an over-boost level can be sustained can be predicted by the thermal model incorporated into each WTG controller based upon a number of parameters. The prediction of duration for each level may be based upon one or more of the following conditional parameters: wind speed; temperature within the nacelle of the turbine; temperature of the WTG 14; external temperature; rotational speed of the WTG 14; time since previous over-boost operation; and blade pitch angle. In some embodiments, the current demand and conditions of the WTG 14 may be compared to information relating to a previous over-boost situation that is stored within a memory module associated with the WTG controller. The prediction may be based upon a previous over-boost situation where the conditions under which that over-boost was made match to the current conditions. The model may update itself by way of an iterative process based upon measured parameters during over-boost situations. As will be discussed later with relation to FIGS. 3 and 4, the thermal model may be regularly updated at a relatively high frequency according to the instantaneous conditions, or alternatively outputs and updates may only be made when requested by the PPC 32.

Figure 3:
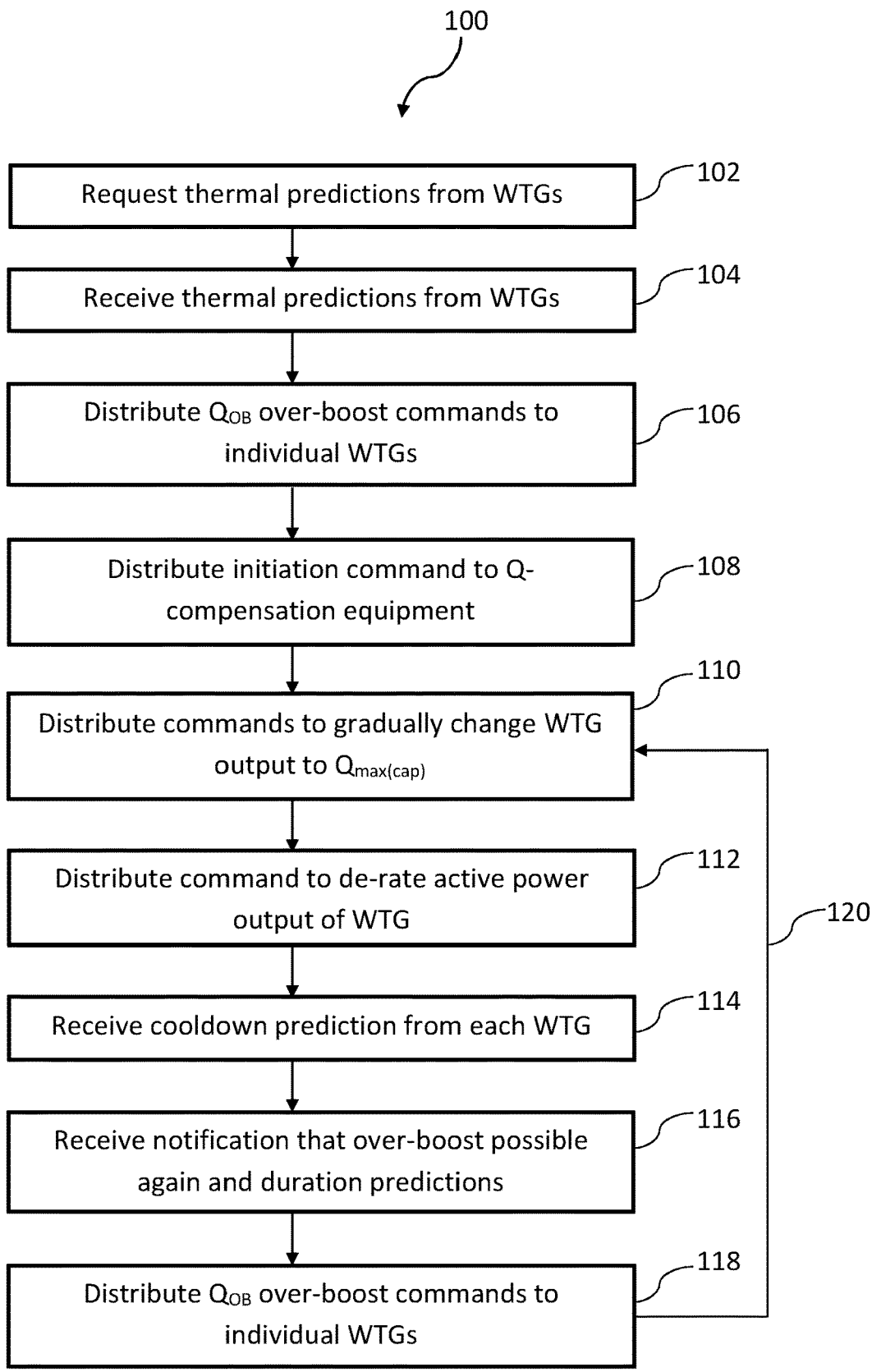
FIG. 3 is a flow chart governing the operation of a power plant controller in response to a demand for increased reactive power supply from a transmission system operator according to an embodiment of the invention.
Figure 4:
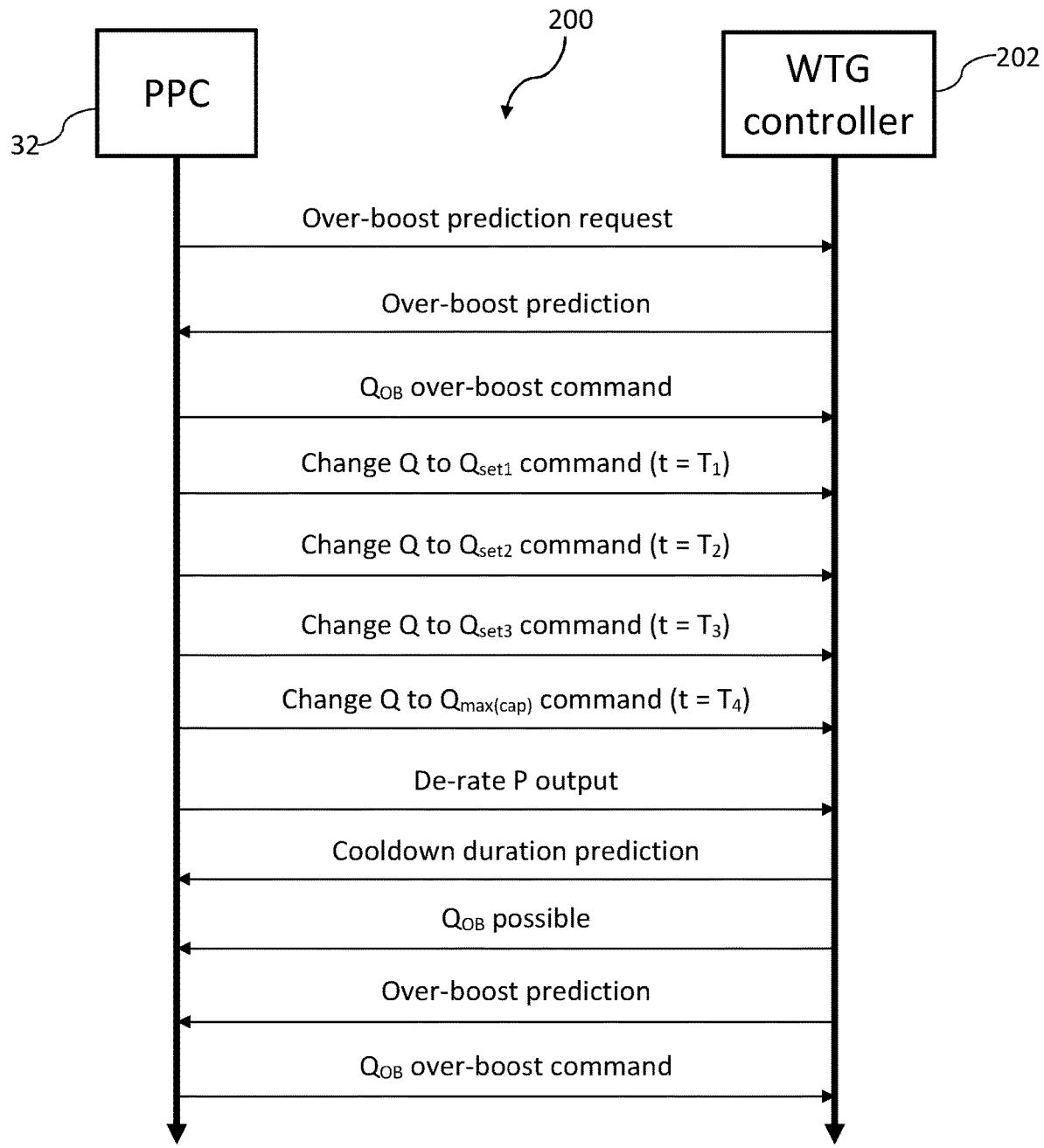
FIG. 4 is an interaction diagram demonstrating the exchange of information/data, and message sequencing, between a power plant controller implementing the process of FIG. 3 and a wind turbine generator according to an embodiment of the invention.

The ability to be able to predict the duration for which each over-boost level is attainable is particularly useful to enable demands of the TSO 36 to be met safely. FIG. 3 illustrates a flow chart 100 that governs the operation of the PPC 32 in such circumstances where increased reactive power is demanded by the TSO 36 above the ordinary capability of the WPP 12. FIG. 4 illustrates a typical exchange of information 200 between the PPC 32 and a WTG controller during over-boost mode. FIGS. 3 and 4 will now be discussed with further reference to FIG. 2. The PPC 32 operates according to the process 100 of FIG. 3 continually until the demand made by the TSO 36 has been met.

In use, each WTG 14 is configured to have a capped maximum reactive power supply level, $Q_{max(cap)}$, here depicted at +410 kVAr at all active power levels. This capped maximum level is depicted in FIG. 2 as the dash-dot line (E). The WTG 14 is able to operate at the capped maximum reactive power supply level in both armature configurations, and at all active power levels above approximately 100 kW. The value chosen for $Q_{max(cap)}$ is chosen to allow this continued operation during armature switching and is chosen as a safe level of operation at which the WTG 14 may operate. At $Q_{max(cap)}$ the WTG 14 is well within its operational capabilities, and therefore, well within its thermal limits and operation at this level is sustainable for long durations without any problems arising.

During operation at $Q_{max(cap)}$ and at a high active power level, i.e. >1400 kW, the TSO 36 may request increased reactive power supply from the WPP 12 that exceeds $Q_{max(cap)}$ and the limit line E shown in FIG. 2 for that particular active power level. In reaction to this the PPC 32 implements the process 100 illustrated in FIG. 3, and communicates with each WTG controller accordingly, requesting and receiving information 200 from the WTG controller according to FIG. 4.

At the first step 102 of the process of FIG. 3, the PPC 32 requests 102 predictions of the thermal capacity of each WTG 14 from the respective WTG controller. The thermal capacity may be defined as the potential of the WTG 14 to be operated above normal operational levels before a thermal limit is reached. The thermal limit may be defined by the temperature of a single component, an average temperature of a plurality of components, an ambient temperature within a nacelle of the WTG 14 itself or another indicative parameter, and may be assessed by comparing the relevant parameter to a predetermined threshold, or to a threshold that is based upon a thermal model and previous data. The capacity or potential required of the WTG 14 by the PPC 32 may be set by the PPC 32 at a predetermined criterion. For example, the PPC 32 may require a particular duration at a particular operating level from a number of WTGs 14 to meet the demand, and this selected duration and level may depend upon the state of the compensation equipment 46 or the demand from the TSO 36. By comparing the predictions received by the PPC 32 to a criterion, the PPC 32 can easily distribute commands correctly.

In return, each WTG controller communicates 104 its thermal capacity in the form of thermally mapped/modelled predictions to the PPC 32. In the embodiment of FIGS. 3 and 4, the predictions incorporate an increased maximum reactive power level, $Q_{OB}$, that may be supplied to meet $Q_{ref}$ and a duration, $Q_{OB\_Duration}$, for which that level can be maintained before a thermal limit is reached. In addition, each WTG controller may further provide predictions of duration for a predetermined number of intermediate reactive power levels.

The intermediate reactive power levels may be predetermined values or set intervals between $Q_{OB}$ and $Q_{max(cap)}$. Each duration value is the duration for which the respective reactive power level is achievable if the WTG is driven at each of those levels sequentially before the reactive power level eventually reduces to $Q_{max(cap)}$. For example, it is envisaged that in some embodiments, $Q_{OB}$ may be requested as 852 kVAr, and in response the WTG controller would return a corresponding $Q_{OB\_Duration}$ as 90 secs, as well as durations for intermediate values such as 714 kVAr and 578 kVAr.

As noted, these durations are calculated from the thermal model by the WTG controller as levels that can be achieved if all levels of reactive power are sequentially demanded from the WTG 14 until it eventually returns to $Q_{max(cap)}$, at which point the WTG 14 will be at its thermal limit. An alternative set of durations may be provided in addition to or instead of these levels. This alternative set of durations may depend upon the capacity of the WTG 14 and the reactive power reference level, and are durations that would be able to be achieved if single leap in reactive power level from $Q_{max(cap)}$ to $Q_{OB}$ and back to $Q_{max(cap)}$ is requested rather than a progressively stepped decrease from $Q_{OB}$ to $Q_{max(cap)}$.

Therefore, by requesting, and subsequently receiving, the levels and durations from the thermal models of the WTG controllers, the PPC 32 implements a hand-shake protocol that allows for an improved operational safety of the WTGs 14. By receiving information tailored to each WTG 14 from each WTG controller, the PPC 32 is able to prioritise the WTGs 14 that have the greatest capacity for over-boost and to reduce the burden shared to those operating at or close to a thermal limit. This is particularly beneficial in extending the working life of a WTG 14.

Once the thermal mapping prediction has been received by the PPC 32 from the WTG controllers, the PPC 32 analyses the predictions received from the WTG controllers and distributes 106 individual commands to respective WTGs 14 to optimally achieve the reactive power request made by the TSO 36. The command includes an over-boost request, and may include a specified reactive power level (e.g. in units of kVAR) and a durational level (e.g. in units of seconds). The command is implemented at the WTG 14 and the reactive power request is met. In terms of the P-Q chart of FIG. 2, at this stage, the WTGs 14 are operating within the hatched or 'over-boost' region.

The PPC 32 also distributes 108 initiation commands to the reactive power compensation equipment 46 in the WPP 12. Increasing WTG 14 reactive power output provides a rapidly responsive output of reactive power when demanded, and is preferable to sole use of compensation equipment 46 as compensation equipment 46, such as capacitor banks, may require a warm-up period before full reactive power compensation can be achieved. Therefore, reactive power demand can be met instantaneously and safely using the WTGs 14 before the compensation equipment 46 is at full operating potential.

While the reactive power compensation due to the compensation equipment 46 increases, the reactive power output of each WTG 14 that is operating in an over-boost mode may be reduced 110 to the safe capped level. There will be some degree of overlap between the compensation equipment 46 and the WTGs 14 to ensure that there is no dip in the supplied reactive power level. The reduction 110 in reactive power supplied by each WTG 14 may be stepped or a single leap or step-up as previously described with relation to the predictions supplied. In the embodiment shown, the reactive power may be reduced incrementally from $Q_{OB}$ to $Q_{max(cap)}$. Each incremental decrease in reactive power supply is commanded by the PPC 32 at the corresponding time. In the event that the WTG 14 reaches its thermal limit before the PPC 32 commands it to reduce its reactive power supply, the WTG controller may automatically reduce output to a lower or safe level and notify the PPC 32. To gradually increase the reactive power compensation, it is envisaged that the compensation equipment 46 will be switched on sequentially to provide incremental increases in reactive power supply. The sequential switching will correspond somewhat with the reduction in reactive power supplied by each WTG 14.

Following the reduction 110 of WTG reactive power output to $Q_{max(cap)}$, active power output of each WTG 14 is de-rated 112. For example, for a 2 MW WTG operating at an active power level of 2 MW that has had its reactive power output reduced to $Q_{max(cap)}$ of 410 kVAr, as in FIG. 2, the active power of the WTG 14 is reduced to 1.8 MW. This enables a faster cool-down of the WTG 14, while enabling prioritisation of reactive power supply over active power supply in the event that reactive power is still demanded, or if the TSO 36 communicates a second reactive power demand quickly after the first demand.

At the next step of the process 100, the PPC 32 receives 114 a further prediction of the duration for which over-boost modes will be unavailable from the thermal model of the WTG controller. Importantly, this allows for planning of the next period of over-boost for each WTG 14 by the PPC 32.

As the unavailability of the WTG 14 is based upon the model and is dependent upon several conditions, the duration may be longer or shorter than initially intended. Therefore, the WTG controller subsequently communicates the availability of over-boost mode and the duration for which the over-boost mode is available as soon as possible, which is then received 116 by the PPC 32. Several separate predictions may be received 116 by the PPC 32 based upon different levels of over-boost and different durations, or that a single $Q_{OB}$ communication may be made.

After having received 116 the new predictions from each WTG controller, and where the TSO's 36 demand is not yet met, the PPC 32 distributes 118 new commands to the WTGs 14 to initiate an additional period of over-boost, and the process continues 120, with reactive power output, cool down periods and additional predictions until the TSO 36 demand is met. The new commands may coincide with a reduction in the reactive power compensation output by the compensation equipment 46, although this is not shown in FIG. 3.

The process 100 of FIG. 3 may be stopped at any time if the TSO's 36 demand is met or if the TSO 36 is no longer demanding the increase in reactive power supply. The PPC 32 subsequently implements another cool-down procedure where the reactive power compensation equipment 46 is switched off, and the WTGs 14 are returned to normal operating modes.

FIG. 4 illustrates the hand-shake protocol and information exchange 200 implemented between the PPC 32 and one WTG controller. In addition to the information exchanges 200 shown, the WTG controller may at any point communicate that it has reached a thermal limit, or may communicate over parameters to the PPC 32 aside from the predictions from the thermal map. For example, the WTG 14 may be configured to communicate to the PPC 32 that it is approaching a thermal limit, the threshold for this communication being predetermined.

An exemplary embodiment of a thermal model that may be implemented by the central controller of each WTG 14 will now be discussed. In this exemplary embodiment, the thermal model is formed of a plurality of pre-determined 'default' relationships. Each relationship is component-specific, and is formed between the measured current magnitude within the component and the time for which that current is achievable before a thermal limit is reached. In addition, for each relationship, a first current level is defined below which the component may be operated for any length of time without reaching its thermal limit. Furthermore, a maximum current level is defined above which operation of the component is not possible.

The default relationships for each component are initially programmed within the central controller. Following installation of the WTG 14, the relationships are adjusted using primary weights that are calculated based upon installation parameters of the WTG 14. To calculate the primary weights, a number of different parameter inputs to the thermal model may be used, such as: altitude of the WTG; generating capacity of the WTG; particular component-specific pre-determined parameters; and ambient temperature range among others.

During operation of the WTG 14, the relationships can be further adjusted by secondary weights, which are calculated using instantaneous measurements within the components, system or grid. Inputs to the thermal model for the purpose of calculating secondary weights may comprise: current measurements of the component; current measurements of adjacent components; instantaneous ambient temperature; temperature of the component measured with a thermocouple or resistance temperature detector; temperature of adjacent components; and/or time elapsed since thermal limit last reached.

The relationships of the thermal model therefore change as the condition of the WTG 14 changes or as conditions external to the WTG 14 change. As the weights of the thermal model alter, one component will have a lowest first current level compared to other components, and therefore sets the limit below which the WTG 14 must be operated in order to reduce the operating temperatures of all components. Similarly, the component having the lowest maximum current level will also set the operational level or levels of the WTG 14 during over-boost mode.

During a request 102 from the PPC 32 to the WTG controller for thermal predictions, the output of the thermal model will therefore be at least the lowest maximum current level and a time for which that level can be achieved. Other intermediate levels may be output as described above.

When considering the cool-down predictions of the thermal model, a similar system will be incorporated, whereby the condition of the WTG 14 and the external conditions around the WTG 14 are taken into account by the WTG controller using a plurality of sensors within the WTG 14 to provide an adjusted relationship between the temperature of each component and the time taken for the component to reach that temperature when operating at a de-rated active power output.

It should be noted that throughout this specification, references to WTGs 14 may relate to the WTG 14 in general, to the controller, or to other control modules or parts of the WTG 14.

Although the system 10 is depicted here as applying to a wind power plant 12, it is possible to apply the system to any other form of renewable energy power plant such as a photovoltaic power plant.

Many modifications may be made to the above examples without departing from the scope of the present invention as defined in the accompanying claims.

The invention claimed is:

1. A wind power plant system comprising:
  a plurality of wind turbine generators having a plurality of corresponding generator controllers; and
  a power plant controller for controlling power generated by the wind power plant system;
  wherein the plurality of generator controllers are each configured to:
    generate a model that indicates a thermal capacity of one or more components of a corresponding wind turbine generator;

determine power capacity data from the model, said power capacity data relating to a reactive power supply level and a corresponding time limit for which that reactive power supply level may be maintained; and transmit to the power plant controller the determined power capacity data, wherein the power plant controller is operable to receive the power capacity data from the plurality of corresponding generator controllers and to transmit respective power references to the plurality of corresponding generator controllers to control the power generated by the wind power plant system, and wherein each power reference comprises a command to a respective generator controller to operate the corresponding wind turbine generator to supply reactive power corresponding to the reactive power supply level of the power capacity data determined by the respective generator controller for a time period that is less than or equal to the corresponding time limit.

2. The wind power plant system of claim 1, wherein the model is generated in dependence upon installation parameters of the corresponding wind turbine generator or upon pre-determined thermal relationships of each component.

3. The wind power plant system of claim 1, wherein the plurality of corresponding generator controllers are configured to alter the model in dependence upon operational conditions of a wind turbine.

4. The wind power plant system of claim 1, wherein the reactive power supply level is in excess of a pre-determined reactive power supply limit so as to provide a reactive power boost.

5. The wind power plant system of claim 1, wherein the corresponding time limit is determined to avoid exceeding the thermal capacity of the one or more components.

6. The wind power plant system of claim 1, wherein the plurality of corresponding power capacity data also includes a cool-down time period.

7. The wind power plant system of claim 1, wherein the plurality of corresponding generator controllers are configured to transmit the determined power capacity data to the power plant controller in response to a request from the power plant controller.

8. The wind power plant system of claim 7, wherein the power plant controller is configured to request power capacity data in response to a request for reactive power supply received from a transmission system operator.

9. The wind power plant system of claim 8, wherein the power plant controller is configured to transmit respective power references to the plurality of corresponding generator controllers in dependence upon the request for reactive power supply or until reactive power supply is no longer requested by the transmission system operator.

10. The wind power plant system of claim 1, wherein the power plant controller is configured to transmit respective power references to the plurality of corresponding generator controllers in dependence upon the received power capacity data.

11. The wind power plant system of claim 1, wherein each power reference comprises at least one further command to the respective generator controller to operate the corresponding wind turbine generator to supply reactive power lower than a level of first command or a de-rating command to the respective generator controller to de-rate the correpsonding wind turbine generator to reduce the reactive power supply or an active power supply, and wherein the de-rating command is transmitted to the respective generator controller after the time period of the command.

12. The wind power plant system of claim 1, wherein the plurality of corresponding generator controllers are each configured to control an operation of the corresponding wind turbine generator in dependence on the transmitted respective power references.

13. The wind power plant system of claim 1, further comprising compensation equipment and wherein the power plant controller is operable to transmit power references to the compensation equipment to maintain the reactive power supply level of the wind power plant system.

14. A method of operating a wind power plant comprising a plurality of wind turbine generators, the method comprising:

receiving, from one or more of the wind turbine generators, power capacity data relating to: at least one reactive power supply level, and a corresponding time limit for which that reactive power supply level may be maintained, and transmitting respective power references to the plurality of wind turbine generators in dependence on the received power capacity data, wherein each power reference comprises a command to a respective generator controller to operate a corresponding wind turbine generator to supply reactive power corresponding to the reactive power supply level of the power capacity data determined by the respective generator controller for a time period that is less than or equal to the corresponding time limit.

15. A computer-readable storage medium comprising instructions which, when executed on a power plant controller of a wind power plant cause the power plant controller to perform an operation, comprising:

receiving, from one or more wind turbine generators, power capacity data relating to: at least one reactive power supply level, and a corresponding time limit for which that reactive power supply level may be maintained; and transmitting respective power references to a plurality of wind turbine generators in dependence on the received power capacity data, wherein each power reference comprises a command to a respective generator controller to operate a corresponding wind turbine generator to supply reactive power corresponding to the reactive power supply level of the power capacity data determined by the respective generator controller for a time period that is less than or equal to the corresponding time limit.

* * * * *